United States Patent
Roesgen et al.

(10) Patent No.: US 6,261,399 B1
(45) Date of Patent: Jul. 17, 2001

(54) PNEUMATIC TIRES AND METHOD OF MAKING

(75) Inventors: Alain Emile Francois Roesgen; David Craig, both of Luxembourg; Atte Smits, Bofferdange; Eric Packbier, Drauffelt, all of (LU); Marie-Rita Thise, Wardin (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/367,766

(22) PCT Filed: Feb. 26, 1997

(86) PCT No.: PCT/US97/03025

§ 371 Date: Aug. 19, 1999

§ 102(e) Date: Aug. 19, 1999

(87) PCT Pub. No.: WO98/38049

PCT Pub. Date: Sep. 3, 1998

(51) Int. Cl.[7] .............................. B29D 30/30; B60C 5/14
(52) U.S. Cl. ................................. 156/123; 152/510
(58) Field of Search ...................... 156/123, 133, 156/110.1, 118; 152/510, 511, 548

(56) References Cited

U.S. PATENT DOCUMENTS

| 1,613,089 | * | 1/1927 | Ellinwood | 156/118 |
| 4,065,338 | * | 12/1977 | Mirtain | 156/123 |
| 5,851,323 | * | 12/1998 | Kaido et al. | 152/510 |

FOREIGN PATENT DOCUMENTS

| 0102844 | 3/1984 | (EP) . |
| 0522468 | 1/1993 | (EP) . |
| 0761478 | 3/1997 | (EP) . |
| WO96/30221 | 10/1996 | (WO) . |

\* cited by examiner

*Primary Examiner*—Geoffrey L. Knable
(74) *Attorney, Agent, or Firm*—Howard M Cohn

(57) ABSTRACT

The present invention relates to new and novel tire construction and method of making same wherein the uncured elastomeric material that is laid upon the tire building drum (22) during building of the tire preform (10) will not experience subtantially meridional stretch which would otherwise cause a decrease in the uniformity of ply thickness during expansion of the preform in the vulcaninzing mold.

4 Claims, 2 Drawing Sheets

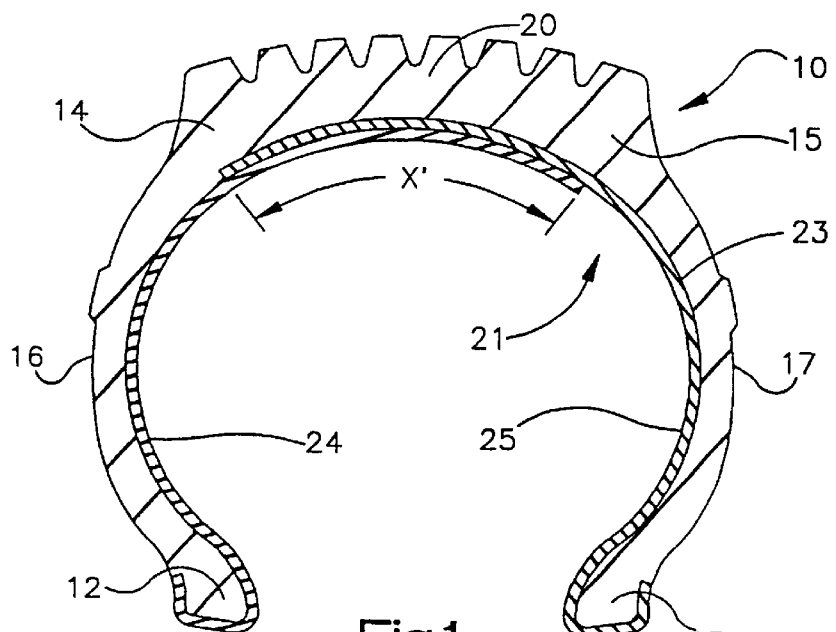
Fig.1
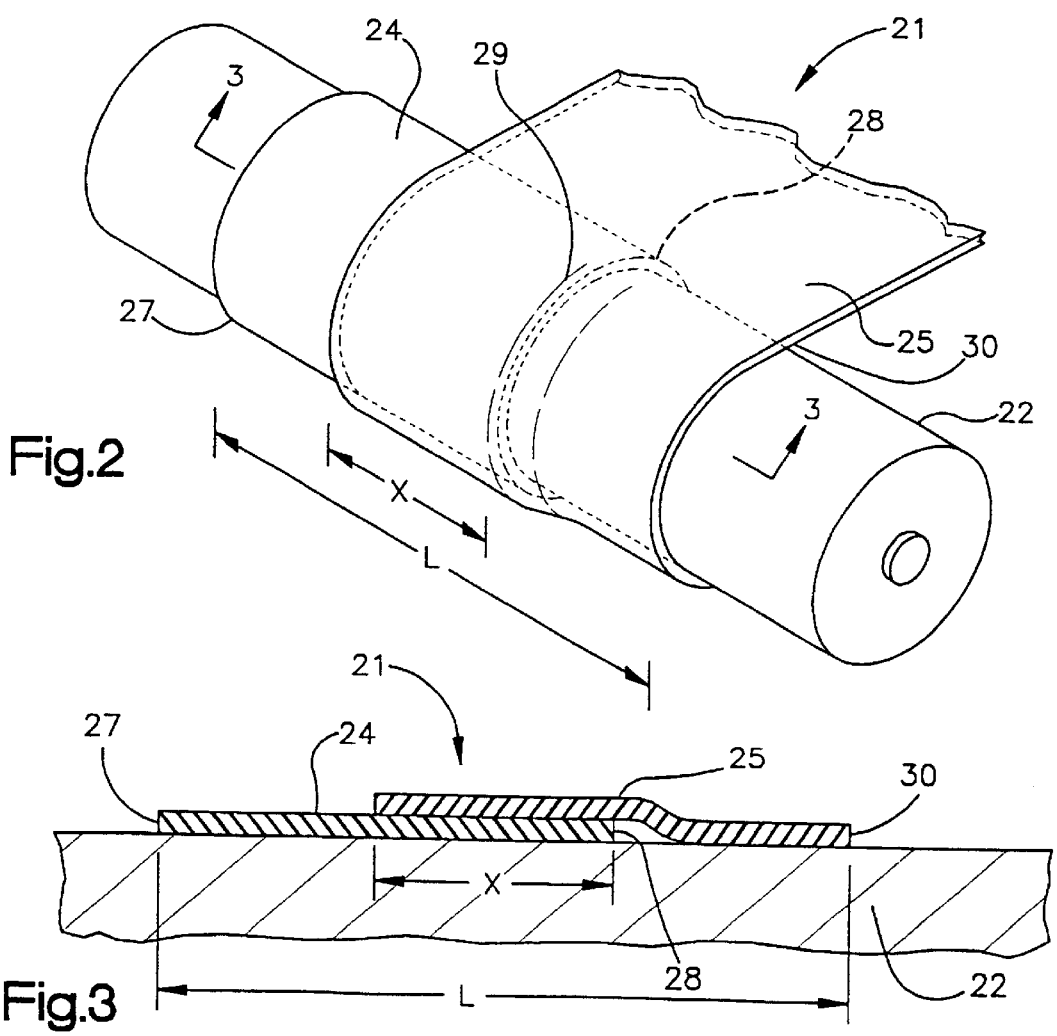
Fig.2
Fig.3

PNEUMATIC TIRES AND METHOD OF MAKING

TECHNICAL FIELD

The present invention relates to pneumatic tires and the method of making such tires. More particularly, the present invention relates to the construction of a preform tire using an inner liner formed of a plurality of overlaying plies.

BACKGROUND OF THE INVENTION

The automotive pneumatic tire is typically made using the flat band method of tire building wherein the various components, or plies, of the tire are applied, as flat stock, upon a rotating tire building drum forming a hollow, barrel shaped preform. In building the preform, the inner liner is first wrapped upon the drum followed by the carcass plies generally containing the tire reinforcement. The carcass plies are then followed by the belt plies, the side wall plies and the tread ply. The barrel shaped preform is then removed from the building drum and placed within a vulcanizing mold, having the general shape of the finished tire. The barrel shaped preform is next heated and expanded radially outward into the mold ask periphery typically by directing pressurized hot gas or steam into a bladder disposed within the preform. During the radial expansion of the preform within the mold, the cylindrically shaped plies must expand radially outward to radial dimensions much beyond those of the original preform. Therefore, the elastomeric material of each preform ply must stretchingly expand much like a balloon. During this expansion step the material thickness of the preform plies may be expected to decrease.

Of particular concern, in the present invention, is the inner liner ply. Typically the inner liner ply is laid upon the building drum as a flat piece of elastomeric stock having a uniform thickness. Thus, as the inner liner ply expands radially outward during the expansion step, the thickness of the inner liner is stretchingly thinned resulting in an inner liner ply having a thickness that progressively decreases from the tire bead area to the tire crown.

Therefore, to have a given inner liner thickness in the tire crown area, the thickness of the inner liner ply, when laid upon the tire building drum, must be oversized to allow for the stretching of the ply as the preform is expanded during the expansion step. Accordingly, the typical automotive tire structure exhibits an inner liner ply having excess material in the tire bead and side wall areas. Prior art patent application WO-A-96 30221 also shows an air-permeation prevention layer (8) with layers (7) extending from ends of a belt (6) toward the center (C).

PRIOR ART

To overcome the above described disadvantage, it has been a practice of the prior art to provide an elastomeric sheet having a variable thickness across its lateral width. Such inner liner sheet stock embodies a sheet thickness that progressively increases toward the center of the sheet from both sides. Thus, when such sheet stock is radially stretched during the expansion step, stretching occurs in the area of increased thickness thereby forming an inner liner having an approximate uniform thickness. However, such specialized sheet stock is more expensive than the uniform thickness sheet stock to manufacture and is unsuitable for rolling and storing on a feed spool prior to applying it upon the tire building drum.

SUMMARY OF THE INVENTION

It is an object of the present invention to provide a method and tire preform structure to eliminate the variable thickness of an automotive pneumatic tire inner liner when built by the flat band method of tire building.

Another object of the present invention is to provide a method and preform structure which results in a savings of elastomeric material in the tire inner liner that aids in weight reduction of a given tire.

In accord with the present invention, the standard practice of applying a single ply of elastomeric material upon the tire building drum to form the inner liner is replaced, in a first embodiment, by two overlapping plies of elastomeric material each having a uniform thickness. The two overlapping plies are laid upon the tire building drum such that when the tire preform is expanded radially outward during the expansion step, the gauge of the overlapping liners is reduced by stretching circumferentially to that necessary to prevent air penetration. Because of the minimal meridional (bead to bead) stretch during the expansion step, a single layer of the liner plies is sufficient.

As an alternative embodiment, the inner liner ply may be made-up of two separate elastomeric plies laid upon the building drum in a spaced relationship to each other with a third ply of elastomeric material being laid thereupon and overlapping the two spaced plies. As with the first embodiment, the three overlapping plies are laid upon the tire building drum such that when the tire preform is expanded radially outward during the expansion step, the gauge of the overlapping liners is reduced by stretching circumferentially to that necessary to prevent air penetration. Because of the minimal meridional (bead to bead) stretch during the expansion step, a single layer of the three liner plies is sufficient.

BRIEF DESCRIPTION OF THE DRAWINGS

FIG. 1 presents a cross sectional view of a typical automotive tire construction, subsequent to expansion of the preform but before vulcanization has taken place, embodying the preferred embodiment of the present invention;

FIG. 2 presents a schematic perspective illustrating the flat band method of building a tire preform and showing application of the inner liner flat stock to the tire building drum in accord with the present invention;

FIG. 3 presents a cross sectional view taken along line 3—3 of FIG. 2 showing the inner liner, flat stock plies as laid upon the tire building drum;

DETAILED DESCRIPTION OF THE INVENTION

Figure 4:
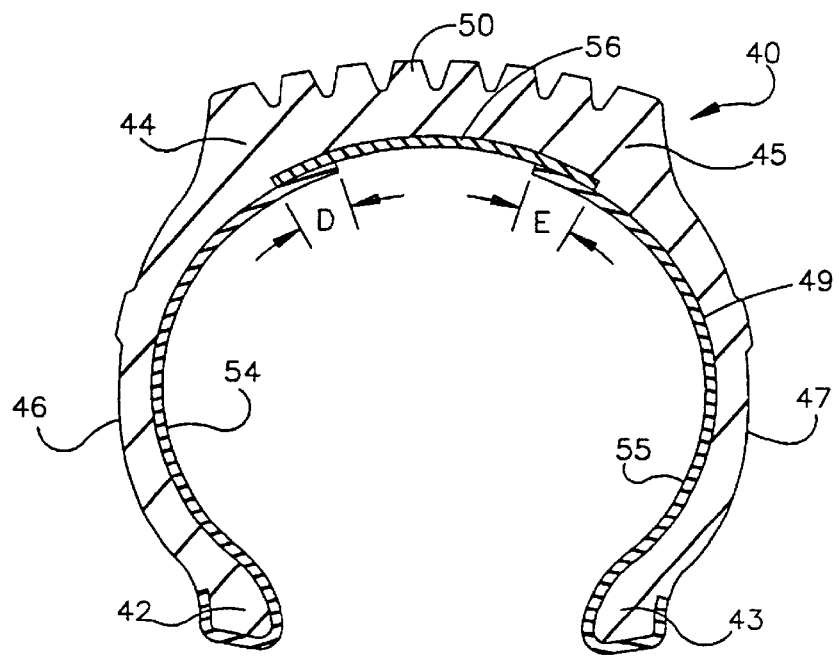
FIG. 4 presents a cross sectional view of a typical automotive tire construction, subsequent to expansion of the preform but before vulcanization has taken place, embodying an alternate embodiment of the invention.

To best illustrate the present invention, FIG. 1 shows a typical automotive tire preform 10, in cross-section, as it exists after expansion of the tire preform but prior to complete vulcanization. Tire preform generally comprises two bead areas 12 and 13, side walls 16 and 17, tread or crown region 20, and an inner liner 21 having two distinct plies 24 and 25, in accordance with the present invention. For clarity of the present invention, the typical carcass reinforcing, extending between bead areas 12 and 13, the belt structure in the crown area under the tread, and the bead ring structure are not shown. The preform has an inner meridional width L extending about the interior surface 23 of preform 10 from the outer edge of bead area 12 to the outer edge of bead area 13, as shown in FIG. 1.

As illustrated in FIGS. 2 and 3, the uncured inner liner 21 comprises two separate and distinct plies 24 and 25 of flat elastomeric material each having a uniform thickness and a width less than width L but greater than one half of width L. During the tire preform building stage, the inner liner plies 24 and 25 are laid upon the tire building drum 22, as illustrated in FIGS. 2 and 3, wherein the first ply 24 extends from one edge 27 of preform width L to a predetermined position 28 on drum 22 beyond the midpoint 29 of width L. The second ply 25 is applied to the drum extending from the opposite edge 30 of preform width L to a predetermined position on drum 22 beyond the midpoint 29 of width L to overlap ply 24. Plies 24 and 25 are arranged to overlap one another by the length X. The length X will necessarily vary depending upon tire size and the desired amount of overlap X' in the expanded tire, as shown in FIG. 1. For clarity of the invention, the additional plies typically applied to the tire preform upon the building drum 22 are not shown.

When a flat band tire preform 10 is built with the inner liner plies 24 and 25 laid upon 1s the tire building drum 22, as shown in FIGS. 2 and 3, and is expanded in the vulcanizing mold, plies 24 and 25, being anchored at beads 12 and 13, respectively, will stretch circumferentially in an amount proportional to the final diameter divided by the diameter of the tire preform prior to expansion. This stretch is responsible for the reduction in the gauge of the plies 24, 25. Typically, during expansion of preform tire 10, there is no substantial meridional, i.e. bead to bead, stretch of the plies. It is preferred that the amount of overlap X', after expansion of the preform, extends across crown 20 and to the breaker or shoulder regions 14 and 15, as illustrated in FIG. 1.

Figure 5:
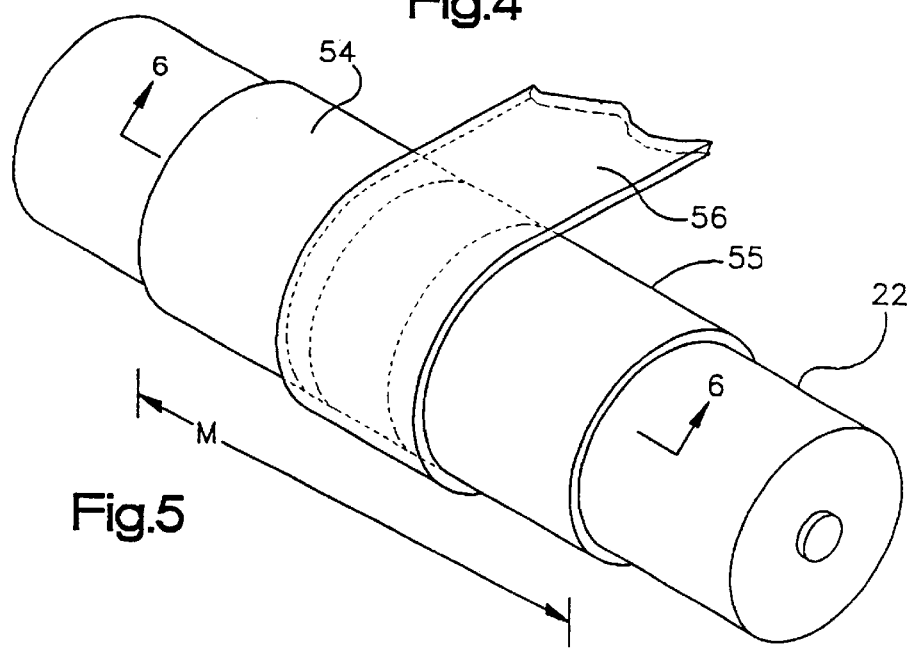
FIG. 5 presents a schematic perspective illustrating the flat band method of building a tire preform and showing application of the inner liner flat stock to the tire building drum in accord with an alternate embodiment of present invention.
Figure 6:
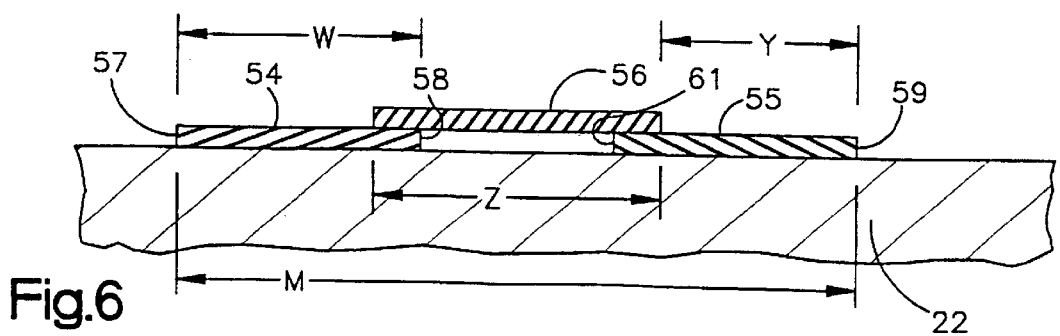
FIG. 6 presents a cross sectional view taken along line 6—6 of FIG. 5 showing the inner liner flat stock plies as laid upon the tire building drum.

Referring now to FIGS. 4, 5, and 6, an alternate embodiment of the present invention is illustrated. A typical automotive tire preform 40, in cross section, is again shown as it exists after expansion of the tire preform but prior to complete vulcanization. Tire preform 40 generally comprises beads 42 and 43, side walls 46 and 47, a tread or crown region 50, and an inner liner having three distinct plies 54, 55, and 56. For improved clarity of the present invention, the typical carcass reinforcement extending between the beads 42 and 43, i.e., the belt structure in the crown area under the tread and the bead ring structure, are not shown. The preform 40 has an inner meridional width M extending about the inner width of surface 49 from the outer edge of bead area 42 to the outer edge of bead area 43.

As illustrated in FIGS. 5 and 6, and in accord with the present invention, the tire inner liner in the uncured stage, comprises three separate and distinct plies 54, 55, and 56 which are shown with a reduced width as compared with FIG. 4. Ply 54 has a width W which is less than inner meridional width M. Ply 55 has a width Y, typically equal to width W. Ply 56 has a predetermined width Z. The plies 54 and 56 are generally of uniform thickness and the middle ply 56 can be thicker. With this construction, the thickness of ply 56 can be selected so that it will be close to the thickness of plies 54 and 55 after the plies are stretched circumferentially in the vulcanizing mold. It is also within the terms of the invention for the three plies to be of the same thickness. During the tire preform building stage, the inner liner plies 54, 55, and 56 are laid upon the tire building drum 22, as illustrated in FIGS. 5 and 6, wherein the first ply 54 extends from one edge 57 of preform width M to a predetermined position 58 on drum 22. The second ply 55 is applied to drum 22 extending from the opposite edge 59 of preform width M to position 61. Ply 56 equally overlaps plies 54 and 55 by a desired amount of overlap D and E, respectively, as shown in FIG. 4. It is preferred that the amount of overlap D and E, after expansion of preform 40, extends across crown 50 and to the breaker regions 44 and 45, as illustrated in FIG. 4. For clarity of the invention the additional plies typically applied to the tire preform upon the building drum 22 are not shown.

When a flat band tire preform 40 is built with the inner liner plies 54, 55 and 56 laid upon the tire building drum 22, as shown in FIGS. 5 and 6, and is expanded in the vulcanizing mold, plies 54, 55 and 56 will stretch circumferentially in an amount proportional to the final diameter divided by the diameter of the tire preform prior to expansion. This stretch is responsible for the reduction in the gauge of the plies 54, 55 and 56. Typically, during expansion of preform tire 40, there is no substantial meridional, i.e. bead to bead, stretch of the plies.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

What is claimed is:

1. In a method of building a pneumatic tire preform comprising bead areas, sidewalls, tread region and an inner liner having a meridional width L upon a tire building drum, the improvement comprising applying the inner liner of elastomeric material to the building drum by:

applying a first ply of elastomeric material upon the building drum whereby the first ply extends from one edge of preform width L to a first predetermined position upon the drum beyond the midpoint of preform width L; and applying a second ply of elastomeric material upon the building drum whereby the second ply extends from the opposite edge of the preform width L to a second predetermined position upon the drum beyond the midpoint of preform width L and overlaps the first ply of elastomeric material;

wherein the first ply has a width less than preform width L; and the second ply has a width less than preform width L.

2. The method of building a tire preform as set forth in claim 1 including the step of providing the first and second plies from a sheet of elastomeric material having a uniform thickness.

3. The method of building a tire preform as set forth in claim 1 wherein the overlap of the second ply over first ply extends across the tread region and to shoulder regions.

4. A tire made by the process of claim 1.

* * * * *